United States Patent [19]

Cyrell et al.

[11] Patent Number: 5,251,859
[45] Date of Patent: Oct. 12, 1993

[54] SUPPORT MOUNT

[75] Inventors: Alexander Cyrell, Hollywood; Garret E. Weyand, San Marino, both of Calif.

[73] Assignee: Omnimount Systems, Tempe, Ariz.

[21] Appl. No.: 847,636

[22] Filed: Mar. 6, 1992

[51] Int. Cl.$^5$ ............................................. F16M 13/00
[52] U.S. Cl. ................................... 248/288.3; 403/90; 403/131
[58] Field of Search .................. 248/288.3, 288.5, 181, 248/344, 323, 324, 343; 403/131, 122, 90

[56] References Cited

U.S. PATENT DOCUMENTS

| | | | |
|---|---|---|---|
| 153,813 | 8/1874 | Dewey | 248/288.5 X |
| 972,480 | 10/1910 | Southwick | 248/288.5 X |
| 973,319 | 10/1910 | Thunen et al. | 403/90 X |
| 1,194,772 | 8/1916 | Newman et al. | 403/90 X |
| 1,914,268 | 6/1933 | Lewis | 403/131 X |
| 2,185,164 | 12/1939 | Weinreb | 248/288.3 X |
| 2,749,074 | 6/1956 | Bodian | 248/344 |
| 3,364,778 | 1/1968 | Griffen et al. | 403/131 X |
| 5,062,026 | 10/1991 | Maglica et al. | 248/288.3 X |

FOREIGN PATENT DOCUMENTS

| | | | |
|---|---|---|---|
| 22472 | 2/1935 | Australia | 403/90 |
| 544759 | 4/1942 | United Kingdom | 403/131 |

Primary Examiner—David L. Talbott
Attorney, Agent, or Firm—Ladas & Parry

[57] ABSTRACT

An adjustable support mount having a clamp plate with a fulcrum and a clamp plate extension. The clamp plate extension has a concave, circular toothed depression forming one half of a socket to hold a ball. The other half of the socket is formed by a jaw plate also having a concave, circular toothed depression positioned on the opposite side of the ball to the clamp plate extension. The jaw plate is positioned on the fulcrum and is kept aligned on the clamp plate by a keyway rib and slot structure. The jaw plate is tightened by a bolt or screw that passes through both the jaw plate and the clamp plate extension into a cap nut. The ball is attached to a shaft which is, in turn, attached to an ultimate support mount. Welded to and encircling the shaft is an eccentric ring. The eccentric ring and shaft are encapsulated by the ball, the ball material passing through and around the eccentric ring and shaft. In a tubular shaft, the open of the shaft is also left open by the ball so that wires or other materials may be passed through the shaft. Due to the eccentric ring within the ball and encircling the shaft, enhanced support performance and strength are realized by the adjustable support mount.

14 Claims, 2 Drawing Sheets

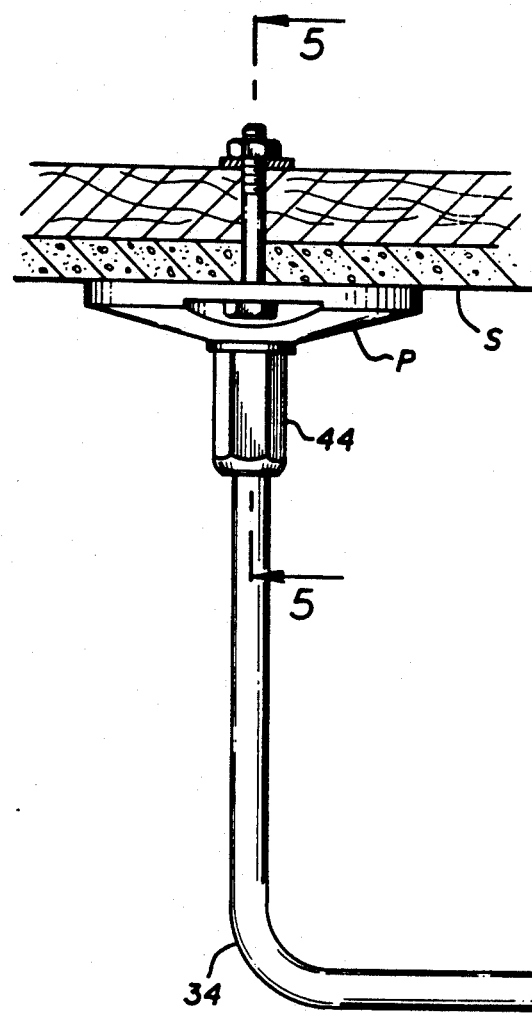
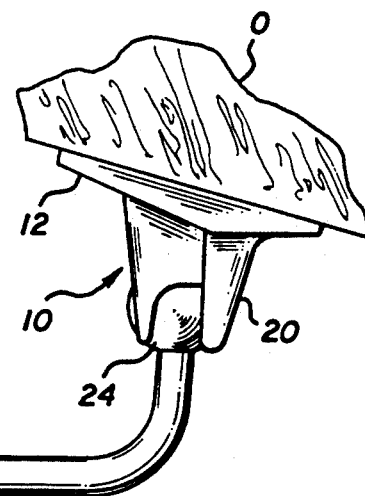
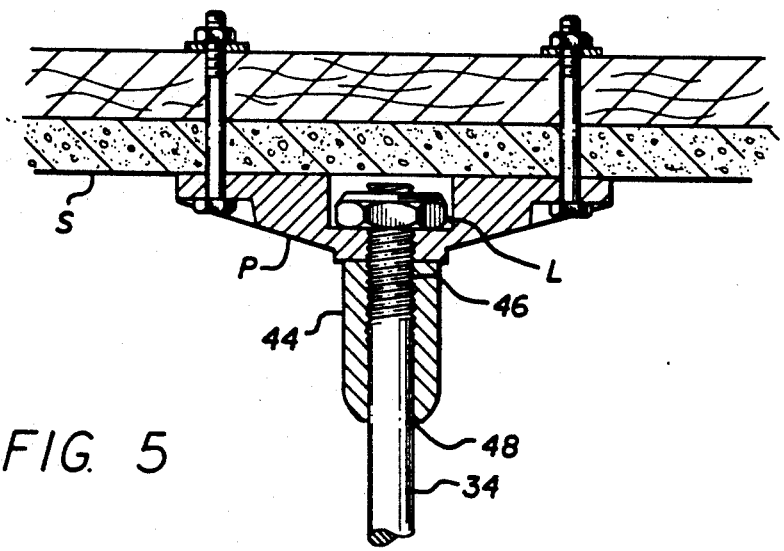
FIG. 4
FIG. 5

SUPPORT MOUNT

FIELD OF THE INVENTION

This invention relates to adjustable support mounts providing support for objects attachable to the mount and more particularly to a ball and socket mounting apparatus that provides improved support and stability.

DESCRIPTION OF THE RELATED ART

Ball and socket joints for mounting objects upon stationary platforms are known in the art and are sometimes referred to as "gimbol joints". In some gimbol joints, a ball is held stationary by compression between two plates. Each plate has an undersized hole to receive the ball and a nut and bolt pass through both plates to apply compression to the ball. The ball is only compressed at those points where it meets the plates.

In other gimbol joints the plates with holes are replaced by socket members. On one side, the ball is held in a half-socket member that has a hole through which a shaft attached to the ball can pass through. The shaft can be adjusted within the hole and the ball attached to the shaft moves with the shaft. A second half-socket member presses the ball against the first half-socket member so that the ball is held in position by friction against the two socket members. The second half-socket member is forced against the ball by a variety of means, including off-centered cams moved by thumbscrews as well as screws that force the second half-socket upwards by pushing on a beveled portion of the second half-socket.

The use of sockets to hold the ball in place experiences the same limitations as for the two plates mentioned above. The sockets rarely match the surface of the ball with the required precision to evenly distribute pressure. With the uneven application of pressure, the gimbol joint tends to wear most where contact is made between the ball and socket. Eventually, wear and tear upon the gimbol joint at its contact points reduces its capacity to securely hold in position the object affixed to it. Ultimately, the gimbol joint is rendered useless and must be replaced.

Such ball and socket joints are also limited in that the cantilever relationship maintained between the object to be supported and its ultimate mount concentrates forces and exerts great stresses upon the ball and socket support mount This load limitation is determined by the ability of the ball and socket to maintain their relative position while under the stress of a load without slippage about the circumference of the ball. The use of a toothed depression that encompasses the ball has also been previously disclosed and provides resistance to slippage and some distribution of the pressures incident upon the ball.

Even with these advancements, problems previously encountered in the art remained, including the exertion of excessive force upon the ball of the support mount that would occasionally shatter the ball or break the bond between the bal and the shaft. For either failure, the mount would no longer hold its position, or the mounted object, safely. There have also been persistent weight limitations restricting the amount of weight that can be attached to a ball and socket support mount.

SUMMARY OF THE INVENTION

The ball and socket support mount of the present invention has a clamp plate with a fulcrum and a projecting clamp plate extension having a concave, toothed circular depression. A removable jaw plate hinges upon the fulcrum and has a corresponding concave, toothed circular depression. The two concave, toothed circular depressions form a socket in which a ball is held. The ball is attached to a shaft that ultimately supports the clamp plate and removable jaw plate. A bolt, or socket head cap screw, with a washer and cap nut is used to hold the jaw plate fixed to the clamp plate. In the preferred embodiment, the clamp plate is bolted or fix to the mounted or supported object. However, the clamp plate can also be affixed to the ultimate support.

The shaft, which in the preferred embodiment is tubular but may be solid, has a ring eccentrically attached to it which surrounds the shaft proximate its end. The shaft and attached ring are enveloped in the ball which is made of strong, resilient material. In the preferred embodiment, the ball does not enclose the tubular end of the shaft, which is recessed from the perimeter of the ball so that wires or the like may be passed through the ball and shaft. If the shaft is solid, the shaft may be enclosed by the ball.

The presence of the fixed ring attached to the shaft permits heavier objects to be mounted on the ball and socket support mount than could previously be mounted. Mounted objects can be adjusted to pass through a greater angle due to increased support and force distribution provided by the eccentrically attached ring to the ball.

Wires related to the object desired to be supported may be passed through the tubular portion of the shaft, thereby allowing greater concealment of the wires and providing a more aesthetic and enhanced appearance for the overall installation.

OBJECTS OF THE INVENTION

It is an object of this invention to provide an improved clamping means by which objects may be supported away from their underlying or fundamental supports.

It is an object of this invention to provide an improved clamping means by which objects may be supported alternate to their underlying or fundamental supports.

It is another object of this invention to provide support means in the form of a ball and socket support mount that provides adjustable positioning of the objects supported and that provides greater angular adjustment for the objects supported.

It is yet another object of this invention to provide an improved construction for the ball portion of a ball and socket support mount whereby greater weights may be supported by the ball and socket support mount.

These and other objects and advantages of the present invention will be apparent from a review of the following specification and accompanying drawings.

BRIEF DESCRIPTION OF THE DRAWINGS

FIG. 4 shows an alternative embodiment of the present invention that allows bottom support for an object from a ceiling.

FIG. 5 is a sectional view along line 5—5 of FIG. 4 showing the internal structure of the mounting plate and the shoulder nut.

DESCRIPTION OF THE PREFERRED EMBODIMENT

Figure 1:
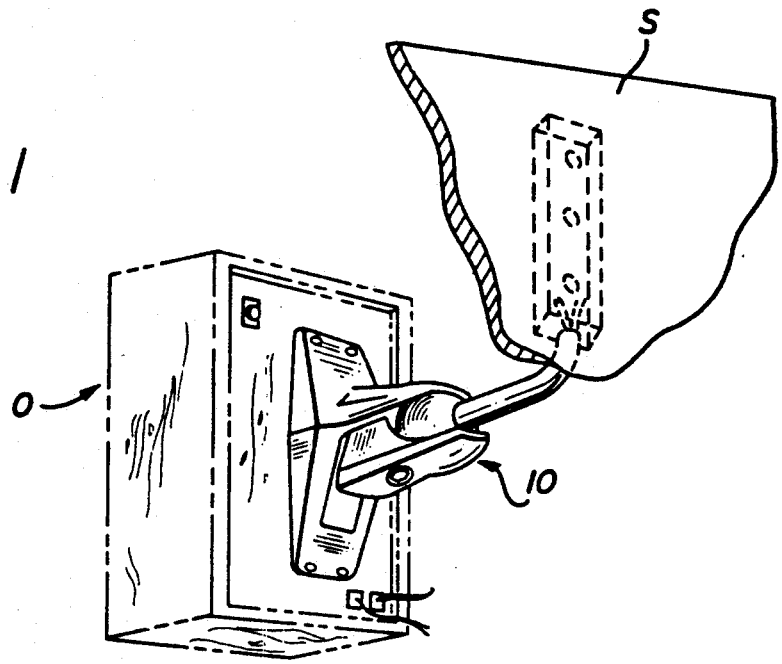
FIG. 1 shows a perspective view of the present invention supporting an audio speaker shown in phantom.

As shown in FIG. 1, the support mount 10 of the present invention is attached to an object to be supported O, such as an audio speaker, and is attached at its other end to a wall or other ultimate support member S.

Figure 2:
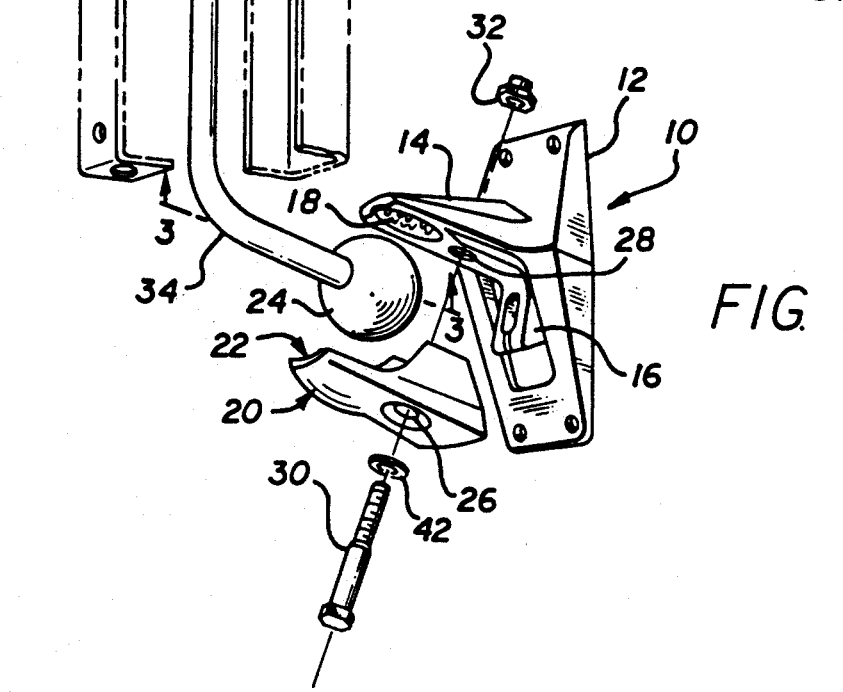
FIG. 2 shows an exploded perspective view of the present invention with its mounting bracket shown in phantom.

As shown in FIG. 2, the support mount 10 of the present invention has a clamp plate 12 with a clamp plate extension 14 and a fulcrum 16. The clamp plate extension 14 has a circular toothed depression 18 to form one half of a socket for the ball 24.

A removable jaw plate 20 fits onto and around the fulcrum 16 of the clamp plate 12, and has a corresponding circular toothed depression 22 opposite the depression 18 of the clamp plate extension 14. The two opposing toothed depressions 18, 22 serve to form a socket for the ball 24. Both the clamp plate extension 14 and the jaw plate 20 have openings 26, 28 near their bases through which a bolt 30 can pass. When positioned between the clamp plate extension 14 and the jaw plate 20 the ball 24 is compressed as the bolt 30 is tightened. The ball 24 becomes securely gripped by the two plates 12, 20.

The fulcrum 16 allows the jaw plate 20 to pivot only through a limited angular range. In the preferred embodiment, the fulcrum 16 allows the jaw plate 20 to open only slightly wider than the ball 24 so that it can be inserted into the socket. The fulcrum 16 allows the substantial compressive forces generated by tightening the bolt 30 and cap nut 32 to be more evenly distributed over the ball 24 through the jaw plate 20 and the clamp plate extension 14. Even force distribution aids in the secure positioning of the supported object O, and allows greater gripping force to be applied to the ball 24 without shattering or breaking it.

The jaw plate 20 has a keyway rib 33 that corresponds to and fits with a keyway slot 35 in the fulcrum 16. Both keyway structures provide added support to their associated members. The keyway rib 33 provides additional strength to the jaw plate 20 while the keyway slot 35 divides the fulcrum 16 into two portions that together provide additional strength to the clamp plate 12. When the jaw plate 20 is fitted upon the clamp plate 12, the keyway structures 33, 35 serve to align the jaw plate 20 upon the clamp plate 12 and to prevent lateral movement by the jaw plate 20 with respect to the clamp plate 12.

The cap nut 32 is of a specific length to hold a certain predetermined and fixed number of threads through which the threaded end of the bolt 30 may pass. Preferably, the bolt 30 is made of grade 8 hardened steel and the cap nut 32 is case hardened to provide greater structural integrity. The bolt 30 is intentionally limited in its travel through the cap nut 32 so that only a limited amount of compression can be applied to the ball 24 through the jaw plate 20 and the clamp plate extension 14. The limited travel of the bolt 30 through the cap nut 32 is noticeable by a person tightening the bolt 30. The noticeable nature of the bolt's limited movement through the cap nut 32 provides the person tightening the bolt 30 with sensory feedback so that he or she can sense when the support mount 10 has been sufficiently tightened without over-tightening. The limited tightening of the bolt 30 provides optimum exertion of force by the socket upon the ball 24.

The bolt 30 and cap nut 32 cannot easily be overtightened due to this limitation and so the jaw plate 20 and the clamp plate 12 are substantially protected from shattering or breaking due to overtightening. If excessive force is applied to the support mount 10 through the bolt 30, the bolt 30 or the cap nut 32 will fail by design rather than transmit such damaging force on to the support mount 10 or the ball 24.

Figure 3:
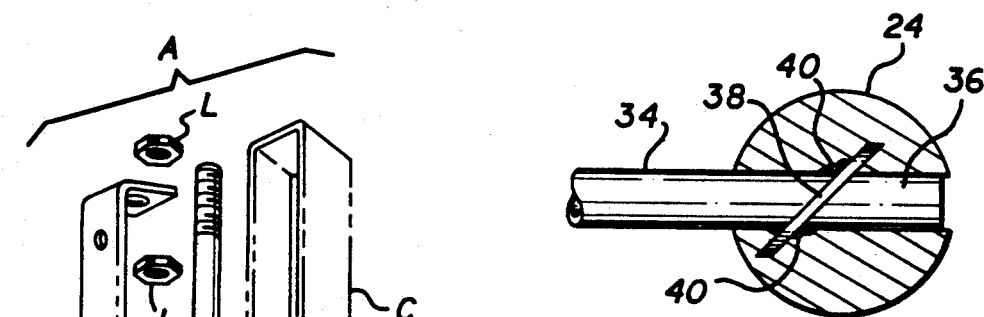
FIG. 3 shows a cutaway view of the ball section at the ball end of the shaft taken along line 3—3 of FIG. 2.

As shown in FIG. 3, the ball 24 of the shaft 34 envelopes and generally encloses the end 36 of the shaft 34. A ring 38 is eccentrically attached to the shaft 34, such as by welds 40, so that the ring 38 is not perpendicular to the main axis of the shaft 34. The eccentric ring 38 provides additional support between the shaft 34 and the ball 24 when the ball 24 is compressed between the jaw plate 20 and the clamp plate extension 14 of the clamp plate 12.

Forces and torques exerted on the ball 24 by the load O are transmitted to the ultimate support S via the shaft 34 and the eccentric ring 38. Adding the ring 38 to the shaft 34 provides more support surface area to the ball interior, providing greater distribution of force. The eccentric nature of the ring 38 change the directions of forces present within the ball 24. Forces arising internally within the ball 24 are more evenly distributed, are applied in more directions, and are applied against and across an increased surface area than when a shaft 34 alone is used.

After the eccentric ring 38 is welded to the shaft 34, the shaft 34 and ring 38 are prepared for encapsulation by the polymer ball 24 by immersion in a thermally reactive chemical adhesive. A polymer material in its heated, flowing form is then applied to the shaft 34 and the ring 38 to generally encapsulate the two. The polymer material of the ball 24 passes around and through the ring 38 and, in the preferred embodiment, leaves open the tubular end 36 of the shaft 34. When the polymer material sets, the eccentric ring 38 and shaft end 36 are mechanically and adhesively attached to the ball 24. In this manner, the ball 24 is effectively locked to the end of the shaft 36 to provide a stable support member for a mounted object O.

The polymer material used for the ball 24 is preferably a material that is strong and resilient. The material should have a specific hardness as measured by durometer and should have a specific memory hysteresis (compression-set).

Preferably, the end 36 of the shaft 34 is somewhat recessed from the ball's surface to form a hollow. This hollow allows the ball 24 to turn further and articulate more within the socket without obstruction from the nearby shaft end 36. Access to the tubular interior of a tubular shaft 34 is maintained at the shaft's ball end 36 to provide a raceway for wires and the like that can travel through the open shaft interior, generally removing them from sight providing a more pleasing appearance to the overall installation. A slot along the face of the clamp plate 12 may also be provided to accommodate wires. Wires may be fed from the shaft 34 through a hole in fulcrum 16 of clamp plate 12 that communicates with the slot on the clamp plate face.

The support mount 10 has its clamp plate 12 affixed as by screws to the object to be supported O. The shaft 34 is fixed to a support S with the ball end 36 free standing.

The jaw plate 20 is then positioned on the fulcrum 16 so that the jaw plate 20 is vertically lower than the clamp plate extension 14 of the clamp plate 12. The bolt 30 is inserted through the washer 42, then inserted through the openings 26, 28 in the jaw plate 20 and the clamp plate extension 14. Preferably, the washer 32 is made of hardened steel. Both the bolt head and the cap nut 32 sit in recesses present in the jaw plate 20 and the clamp plate extension 14, respectively. The bolt 30 is then loosely threaded into the cap nut 32.

Before the bolt 30 is tightened, the ball 24 is inserted into the socket formed by the two circular tooth depressions 18, 22 of the jaw plate 20 and the clamp plate extension 14. The object to be supported O is then adjusted so that it is in its final position. The bolt 30 is then tightened until the mounted object O is firmly held in position or until stopped by the cap nut 32, with the teeth of the circular depressions 18, 22 sinking somewhat into the ball 24. The ball 24 has a tendency to compress somewhat under pressure, which slightly distorts its spherical shape. This slight elliptical distortion of the ball's spherical shape enhances the stability of a support mount 10 as a whole and prevents rotational slippage and loss of the chosen angle of adjustment. The load or object supported O is then sturdily supported by the support mount 10 with the ball 24 of the shaft 34 securely gripped at an optimum pressure.

The shaft 34 is ultimately mounted to a beam or wall support S by means of a bracket assembly A or mounting plate P attached thereto. The bracket B is protected and covered by a removable cosmetic cover C which encloses the free end of the shaft 34, a lock nut L, a jam nut J, and part of the shaft 34. The cover C is held in position on the bracket B by interlocking bosses on the inside of the cover that correspond to notches on the bracket B. The top hole of the bracket B, through which a bolt or screw may hold the bracket B in place, may be offset to one side so that the jam nut J may turn freely. The bracket B may also have reinforcing ribs running down its sides to provide additional structural support for the bracket B.

The lock nut L may have a conventional nylon locking ring formed into its top portion to prevent the lock nut L from moving once it has been threaded on the end of the shaft 34 to provide greater safety in securing the mounted object O. The nylon locking ring prevents the shaft from unthreading due to rotational movement of the shaft 34 subsequent to installation. For some applications, such rotational movement often occurs after installation.

In order to mount the shaft 34 into the bracket B, the free end of the shaft 34 is threaded and is first passed through the bottom opening of the bracket B. The jam nut J is then threaded as far as possible onto the end of the shaft 34 to leave free the end of the shaft 34. The free shaft end is passed through the top opening of the bracket B. The jam nut J stops the shaft's travel through the top hole of the bracket B.

The lock nut L is then threaded onto the threaded end of the shaft 34. If the lock nut L has a nylon locking ring (not shown), the lock nut L need not be threaded very far onto the end of the shaft 34, but should travel far enough onto the shaft 34 for at least two threads to penetrate the lock nut L. The lock nut L rests against the top of the bracket B and the jam nut J is unthreaded from where the threads end on shaft 34 and tightened against the lower portion of the top of the bracket B. The top of the bracket B is then tightly and fixedly held between the lock nut L and the jam nut J and the shaft 34 is held securely in place.

To adjust the relative position of the shaft 34 with respect to the bracket B, the jam nut J is loosened and the shaft 34 turned about while the shaft 34 remains in the bracket B. Once the desired position is reached, the jam nut J is tightened against the top of the bracket B to hold the shaft 34, with the supported object O, in place. The cosmetic cover C is then placed over the mounting bracket B, leaving exposed only the shaft 34 portion ending in the ball 24, support mount 10, and its attached object or load O.

With the use of nylon locking rings within the lock nut L, it is preferable to apply lock nuts to the shaft end at the factory or at least before delivered to the consumer. When brackets B are used, this is not possible and the lock nut L must be affixed by the person installing the support mount.

However, when mounting plates P are used, the shoulder nut 44 or the jam nut J is threaded onto shaft 34 as far down as is possible The mounting plate P is then affixed onto shaft 34 and positioned against the top of the shoulder nut 44 or the jam nut J. The lock nut L with its integral nylon locking ring is then affixed to the end of the shaft 34. Preferably, the lock nut L with its nylon locking ring is affixed to the shaft 34 at the factory, or at least before delivery to the consumer. In order for the nylon locking ring to provide greater safety, at least two threads of the shaft 34 should penetrate and pass through the nylon locking ring.

Once the lock nut L has been affixed to the threaded end of the shaft 34, the shoulder nut 44 or jam nut J is hand tightened against the mounting plate P. The lock nut L then seats itself within the space provided for it on the inside of the mounting plate P. The lock nut L prevents the shaft 34 from unscrewing from the mounting plate P during rotational or lateral movement of the shaft 34 during and subsequent to final installation.

For the embodiment of the present invention shown in FIG. 2, the bolt holes of the bracket B are not accessible if the shaft 34 is threaded through the bracket B. The lock nut L with the integral nylon locking ring must then be threaded onto the shaft end by the consumer. Once a lock nut L with a nylon locking ring has been threaded onto the end of the shaft 34, it should not be removed. If the lock nut L with the nylon locking ring is removed, it should be replaced as the nylon locking ring is intended for use only one time.

In a similar manner, the positions of the shaft 34 and clamp plate 12 may be reversed. The shaft 34 may be fixed to the object O to be mounted, while the clamp plate is fixed to a support S. The interaction between the ball 24 and socket is much the same as the preferred embodiment, as is the operation of the support mount 10, generally.

The shaft 34 may take on a number of lengths, sizes, and shapes, including a partial "U" shape so that objects O may be mounted onto the support mount 10 from below rather than from the side. FIG. 4 shows such a configuration. Mounting plates P or brackets B can be attached to almost any stable structure capable of supporting the load born by the support mount 10, including walls, studs, floors, decks, ceilings, rafters, beams, joists, and the like.

Alternatively, objects O may also be supported from the top, drawing ultimate support from a wall, stud, ceiling, or rafter, or joist. The shafts 34 used with such a configuration may be straight or "L" shaped.

Alternative means for ultimately mounting the shaft 34 may be accomplished in ways similar to that given above for the bracket B. When the ultimate support for the support mount 10 an internal beam, rafter, or joist, pipe or all-thread rod may be used to intermediate the distance between the beam and the support mount 10. Pipe, such as that used in plumbing, is structurally sound and provides ample support when used in conjunction with the support mount 10 of the present invention. The pipe is attached to a mounting plate or other attachment to the ultimate support. Pipe flanges as are known in the art may be used to provide a mounting plate.

When pipe is used to extend the shaft 34 and attach the support mount 10 of the present invention to its ultimate support, an adapter (not shown) may be used to connect the pipe to the shaft 34. One side of the adapter receives the threaded pipe end while the other side of the adapter receives the threaded end of the shaft 34. By using pipe, related pipe configurations such as elbows, joints, and the like can be used in conjunction with the support mount 10 of the present invention.

As shown in FIGS. 4 and 5, when the support mount 10 is suspended from a rafter, joist, or when otherwise appropriate, a shoulder nut 44 is used. The shoulder nut 44 helps to minimize static load stress created by the off-set center of gravity of the mounted object O. Additionally, the shoulder nut 44 transfers any potential dynamic loading (caused by bumping, etc.) away from the threaded section of the shaft 34.

The shoulder nut 44 has threads 46 cut into it in a special way so that should stress be applied to the shaft 34, as when the support mount 10 or the object O are bumped, the shaft 34 threads are protected. Only part of the shoulder nut 44 is threaded. The other part of the shoulder nut 44 is bored out so that it is slightly larger than the outside diameter of the unthreaded section of the shaft 34. This bored-out par is smooth and unthreaded. The shoulder nut 44 is threaded onto the shaft 34 so that the threaded portion 46 of the shoulder nut 44 is nearest the ultimate support S of the support mount 10. Any deformation caused by stress will take place at or before the point where the shaft 34 first enters the shoulder nut 44 (where there are no threads). In this way, while deformation may occur to the shaft 34, the supported object O remains secure and stably mounted. Stress is kept away from the threaded section of the shaft 34, thus protecting its weakest point.

Support mounts 10 incorporating longer shafts 34 are fabricated from a carbon steel formula that provides ductility, allowing support mount 10 to absorb dynamic loading. Deforming would therefore take place in the form of bending of the shaft 34 substantially before it would fracture and fail under dynamic loading.

When a mounting plate P is used to attach the support mount 10 to a rafter, joist, or the like, a lock nut L similar to the one used with the bracket B is used on the inside of the mounting plate P while the shoulder nut 44 is used on the outside of the mounting plate P. The shaft 34 passes through the smooth end of the shoulder nut 44 which is then threaded onto the shaft 34 to leave exposed part of the threaded end of the shaft 34. The exposed threaded end portion of the shaft 34 should be sufficiently long to allow it to pass through the mounting plate P so that a lock nut L can be used. The lock nut L is then threaded onto the shaft 34 to hold the shaft 34 in place. The shaft 34 and/or object O are adjusted into a final set position and the shoulder nut 44 is tightened to compress part of the mounting plate P between it and the lock nut L, holding the shaft 34 firmly in place.

The shoulder nut 44 is also used with alternative components to the mounting plate P. Plumbing pipe adapters and all-thread rod adapters have been developed to connect various diameter shafts 34 to plumbing pipe, all-thread rod, and other support systems.

While the present invention has been described wit regards to particular embodiments, it is recognized that additional variations of the present invention may be devised without departing from the inventive concept.

What is claimed is:

1. An adjustable support mount attachable to an object to be supported, comprising:
   a shaft having first and second ends;
   a ring encircling and attached to said shaft at said first end of said shaft, said ring being attached at said first end of said shaft at an angle departing from the perpendicular to a major axis of said shaft;
   a ball at least partially enveloping said ring and said shaft at said first end;
   a clamp plate attachable to the object to be supported, said clamp plate having a clamp plate extension with a concave circular toothed depression forming one half of a socket for said ball;
   a jaw plate removably and hingably fitting onto said clamp plate, said jaw plate also having a concave circular toothed depressing forming another half of said socket for said ball;
   attachment means for removably attaching said jaw plate to said clamp plate;
   said ball-enveloped first shaft end fitted within said socket formed by said clamp plate and said jaw plate;
   said attachment means for attaching said clamp plate and said jaw plate compressing said ball between said clamp plate and said jaw plate whereby said clamp plate attached to the object maintains a fixed position.

2. The adjustable support mount of claim 1, wherein said shaft is tubular.

3. The adjustable support mount of claim 1, wherein said ring is eccentrically attached to said shaft.

4. The adjustable support mount of claim 2, wherein said ball does not enclose the tubular opening of said first end of said shaft.

5. The adjustable support mount of claim 1, wherein said attachment means for removably attaching said jaw plate to said clamp plate comprises:
   a bolt or screw;
   a cap nut having a closed end whereby said bolt or said screw only turns a certain distance into said cap nut whereby compression upon said ball by said clamp plate and said jaw plate is limited yet optimized, and prevents application of excessive force to said ball by said clamp plate and said jaw plate.

6. The adjustable support mount of claim 5, wherein said cap nut further comprises:
   a predetermined and fixed number of threads.

7. The adjustable support mount of claim 1, further comprising:
   a shoulder nut, said shoulder nut threaded at one end and not threaded at another end, said shoulder nut threaded upon said second end of said shaft.

8. An adjustable support mount attachable to an object, comprising:

a tubular shaft having first and second open ends;

a ring encircling and attached to said first end of said shaft in an eccentric manner, said ring having a dimension larger than the diameter of said shaft;

a ball encapsulating said eccentric ring and said first shaft end save for the tubular opening of said first shaft end;

a clamp plate having a clamp plate extension and a fulcrum with a keyway slot, said clamp plate extension having a concave circular toothed depression forming a first of two socket halves;

a jaw plate removably and hingeably fitting on said clamp plate at said fulcrum, said jaw plate also having a circular toothed depression forming a second of said two socket halves;

a bolt or screw, said bolt or said screw passing through said jaw plate and said clamp plate; and a cap nut, said cap nut threaded onto said bolt or said screw and allowing said bolt or said screw to turn only a certain distance within said cap nut.

9. The adjustable support mount of claim 8, further comprising:

a shoulder nut, said shoulder nut threaded at one end and not threaded at another end, said shoulder nut threaded upon said second end of said shaft.

10. The assembly of claim 9, wherein said ring is attached to said shaft by spaced welds and wherein material forming the ball passes through said ring.

11. A shaft and ball assembly for use in an adjustable support mount, so the assembly comprising:

(a) shaft having first and second end;

(b) a ring encircling and attached to said shaft near said first end of said shaft, said ring being attached at an angle departing from a perpendicular to a major axis of said shaft at said first end; and a ball at least partially enveloping said ring and said shaft at said first end.

12. The assembly of claim 11 wherein said shaft is tubular and has a tubular opening at the first end thereof, and wherein said ball does not enclose the tubular opening of said first end of said shaft.

13. A method of manufacturing a shaft having a ball at an end thereof for use with an adjustable support mount, said method comprising the steps of:

providing a shaft having first and second ends;

attaching a ring which encircles said shaft near the first end thereof; and at least partially encapsulating the first end of said shaft and said ring with a polymer material.

14. The method of claim 13, wherein said encapsulation step comprises immersing the first end of the shaft and said ring in a thermally reactive chemical adhesive and applying a polymer material, heated to a temperature at which it flows, to said shaft into said ring to generally encapsulate the two, the polymer material passing around and through the ring.

* * * * *